United States Patent
Sumner

(10) Patent No.: US 7,370,192 B2
(45) Date of Patent: May 6, 2008

(54) METHOD AND APPARATUS FOR PREVENTING CLONING OF SECURITY ELEMENTS

(75) Inventor: Reuben Sumner, Rehovot (IL)

(73) Assignee: NDS Ltd., Middlesex (GB)

( * ) Notice: Subject to any disclaimer, the term of this patent is extended or adjusted under 35 U.S.C. 154(b) by 663 days.

(21) Appl. No.: 10/496,444

(22) PCT Filed: Mar. 31, 2003

(86) PCT No.: PCT/IL03/00263

§ 371 (c)(1),
(2), (4) Date: Jun. 20, 2004

(87) PCT Pub. No.: WO2004/088484

PCT Pub. Date: Oct. 14, 2004

(65) Prior Publication Data

US 2005/0123132 A1    Jun. 9, 2005

(51) Int. Cl.
*G06F 9/00* (2006.01)
(52) U.S. Cl. .............. 713/100; 713/155; 713/161
(58) Field of Classification Search ............. 713/100, 713/155, 161
See application file for complete search history.

(56) References Cited

U.S. PATENT DOCUMENTS

| 5,832,090 | A | 11/1998 | Raspotnik |
| 6,012,636 | A | 1/2000 | Smith |
| 2002/0047049 | A1 | 4/2002 | Perron et al. |

FOREIGN PATENT DOCUMENTS

WO    WO 96/21225    7/1996

OTHER PUBLICATIONS

A. Menezes, P. van Oorschot, and S. Vanstone, *Handbook of Applied Cryptography*, Chapter 5, Pseudorandom Bits and Sequences (CRC Press, 1996).

*Primary Examiner*—Thomas R. Peeso
(74) *Attorney, Agent, or Firm*—Welsh & Katz, Ltd.

(57) ABSTRACT

A method for preventing cloning of a genuine security element is described. The method includes associating a random number generator (RNG) in the security element with a portion of a non-volatile memory (NVM) in the security element, and activating the RNG to automatically write, during a normal operation mode of the security element, a new random number into the portion of the NVM whenever an attempt is made to write into the portion of the NVM. Any unit other than the RNG is preferably prevented from writing data into the portion of the NVM during the normal operation mode of the security element. Related apparatus and method are also described.

18 Claims, 3 Drawing Sheets

METHOD AND APPARATUS FOR PREVENTING CLONING OF SECURITY ELEMENTS

FIELD OF THE INVENTION

The present invention relates to security elements that include a memory such as a non-volatile memory, and more particularly to removable security elements.

RELATED APPLICATION INFORMATION

The present application is a 35 USC §371 application of PCT/IL03/00263, filed on 31 Mar. 2003 and titled "Method and Apparatus for Preventing Cloning of Security Elements".

BACKGROUND OF THE INVENTION

Security elements, in particular removable security elements such as smart cards, are widely used in secure communication systems to provide conditional access to services such as banking services and television transmission services. A major concern associated with conditional access in which embedded or removable security elements are used is cloning of genuine security elements through which unauthorized users may gain access to services provided to authorized users. Finding ways to prevent such cloning of genuine security elements is therefore considered as highly desired.

Some aspects of technologies and related art that may be useful in understanding the present invention are described in Chapter 5 of *Handbook of Applied Cryptography*, by Alfred J. Menezes, Paul C. van Oorschot and Scott A. Vanstone, CRC Press LLC, 1997, the disclosure of which is hereby incorporated herein by reference.

SUMMARY OF THE INVENTION

The present invention seeks to provide a method and apparatus for combating cloning of security elements that include some form of non-volatile memory (NVM).

In the present invention, a security element such as a smart card having an NVM is provided with a protection mechanism that creates a unique identification number that, except with negligible probability as is well known in the art of cryptography, cannot be copied from one element to another element that has the same protection mechanism.

The protection mechanism includes a random number generator (RNG) that is associated with a portion, such as a field, of the NVM of the security element. During a normal operation mode of the security element, the RNG preferably automatically writes a new random number into the field whenever an attempt is made to write into the field. Preferably, the field is accessible only by the RNG during the normal operation mode of the security element so that the RNG is the only entity that can write into the field during the normal operation mode of the security element.

If the RNG and the field enable a large enough number of random number combinations and the RNG does not repeat any given value with more than negligible probability as is well known in the art of cryptography, the probability of generating, in any attempt to counterfeit the security element, a new random number that is already written in the security element or in another genuine security element becomes negligible as is well known in the art of cryptography. The new random number is therefore different from a random number previously written into the field and from random numbers written in other genuine security elements distributed to users, except with negligible probability as is well known in the art of cryptography.

Thus, even if a hacker knows a random number that is written in a memory of a genuine security element, the hacker has no control over the RNG and he cannot, for all practical purposes, force the RNG to write the same number into clones that have the same type of protection mechanism. Also, any attempt by a corresponding RNG of a clone security element having the same type of protection mechanism to write the same number in a memory of the clone security element will end up, except with negligible probability as is well known in the art of cryptography, with a different random number being automatically written by the corresponding RNG of the clone security element into a corresponding field of the memory. The contents of a field that includes such a random number in any security element distributed to a user may therefore, under certain circumstances, be maintained insecure from the point of view of allowing the random number to be read, as opposed to random numbers that are kept secret in conventional secrecy mechanisms.

Preferably, the protection mechanism enables use of an NVM test mode for testing the NVM of the security element. The NVM test mode is preferably distinguished from a conventional functional test mode of the security element in which typically all circuitry of the security element is tested. The NVM test mode is typically employed before the security element is distributed to users and the NVM of the security element preferably has a facility to mark the security element as unusable, but testable, during the NVM test mode. At the end of the NVM test mode, an initial constant or random value may be present in the corresponding field, such initial value being for example a non-randomly selected number such as zero or a fixed number which is randomly-generated. The initial value is typically written only for testing purposes and is not normally used in a genuine security element distributed to a user.

After NVM testing of the security element is completed, the security element is switched to a normal operation mode during which the RNG automatically writes a random number into the field. This random number renders the security element as one time programmable (OTP) since, except with negligible probability as is well known in the art of cryptography, any attempt to override this number ends up with a different random number written into the field, which number is not used by any other genuine security element.

Preferably, before genuine security elements are distributed to users, each genuine security element is checked to ensure that it has a random number written in the specified field. Random numbers of the genuine security elements may preferably be registered, for example at a central facility.

There is thus provided in accordance with a preferred embodiment of the present invention a method for preventing cloning of a genuine security element, the method including: associating a random number generator (RNG) in the security element with a portion of a non-volatile memory (NVM) in the security element, and activating the RNG to automatically write, during a normal operation mode of the security element, a new random number into the portion of the NVM whenever an attempt is made to write into the portion of the NVM.

The new random number is preferably different from a random number previously written into the portion of the NVM up to a predetermined probability level.

Preferably, the associating includes preventing any unit other than the RNG from writing data into the portion of the NVM during the normal operation mode of the security element.

There is also provided in accordance with a preferred embodiment of the present invention a protection mechanism for preventing cloning of a genuine security element, the protection mechanism including: an NVM, and an RNG operatively associated with a portion of the NVM and activated to automatically write, during a normal operation mode of the security element, a new random number into the portion of the NVM whenever an attempt is made to write into the portion of the NVM.

Preferably, the new random number is different from a random number previously written into the portion of the NVM up to a predetermined probability level.

Further preferably, the security element includes at least one of the following: a smart card; and a security micro-controller. The portion of the NVM preferably includes a field. The portion of the NVM is preferably accessible only by the RNG during the normal operation mode of the security element.

Additionally, the protection mechanism also includes a processor operative to determine a mode of operation of the security element, wherein if the security element is in an NVM test mode the processor is operative to perform the following: disable usability of the security element for providing secure access to a service, and enable testing of the NVM of the security element.

Preferably, the processor is also operative to mark the security element as unusable when the security element is in the NVM test mode.

The protection mechanism is preferably embodied in the security element.

Further in accordance with a preferred embodiment of the present invention there is provided a method for preventing cloning of a genuine security element, the method including: associating an RNG in the security element with a portion of an NVM in the security element, determining a mode of operation of the security element, and if the security element is in an NVM test mode: disabling usability of the security element for providing secure access to a service, and enabling testing of the NVM of the security element, and if the security element is in a normal operation mode: activating the RNG to write a first random number into the portion of the NVM on transition from the NVM test mode to the normal operation mode, and activating the RNG to override the first random number written into the portion of the NVM and to write a new random number into the portion of the NVM whenever a new attempt is made to write into the portion of the NVM.

Preferably, the new random number is different from the first random number up to a predetermined probability level.

Additionally, the method also includes marking the security element as unusable when the security element is in the NVM test mode.

Further additionally, the method also includes transmitting the first random number in a signed message to a central facility. Still further additionally, the method includes extracting the first random number from the signed message, and checking the first random number to verify its existence in a database of random numbers of genuine security elements.

Alternatively, the method includes disabling usability of the security element for providing secure access to the service during the normal operation mode of the security element if a signature of a random number generated by the RNG does not match a signature of the first random number.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
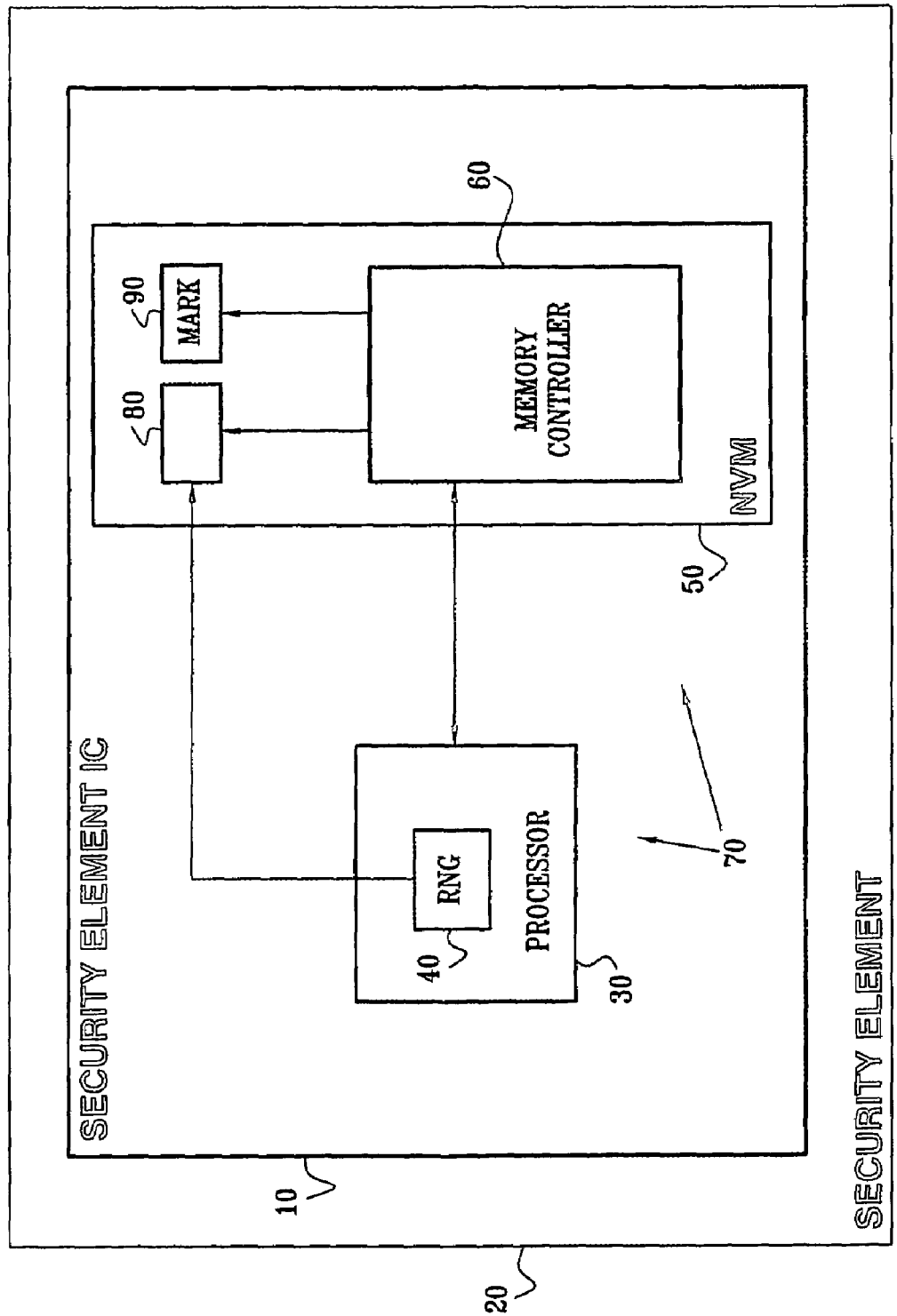
FIG. 1 is a simplified block diagram illustration of a security element integrated circuit (IC), the IC being constructed and operative in accordance with a preferred embodiment of the present invention.

Reference is now made to FIG. 1, which is a simplified block diagram illustration of an integrated circuit (IC) 10 of a security element 20, the IC 10 being constructed and operative in accordance with a preferred embodiment of the present invention. The security element 20 may include, by way of example and without limiting the generality of the description, a removable security element such as a smart card that is also known as a chip card, or alternatively a security micro-controller.

Preferably, the IC 10 includes a processor 30 having a random number generator (RNG) 40, a non-volatile memory (NVM) 50 such as an electrically erasable programmable read-only memory (EEPROM), and a memory controller 60. Random number generators are well known in the art and described, for example, in Chapter 5 of *Handbook of Applied Cryptography*, by Alfred J. Menezes, Paul C. van Oorschot and Scott A. Vanstone, CRC Press LLC, 1997, the disclosure of which is hereby incorporated herein by reference.

The RNG 40 and the NVM 50, operated under control of the processor 30 and the memory controller 60, preferably form a protection mechanism 70 that may preferably be used to prevent cloning of the security element 20. The protection mechanism 70 preferably creates a unique identification number that, except with negligible probability as is well known in the art of cryptography, cannot be copied from the security element 20 to another security element that has the same protection mechanism.

Preferably, the RNG 40 is associated with a portion of the NVM 50, such as a field 80. The RNG 40 may preferably be activated to automatically write, during a normal operation mode of the security element 20, a new random number into the field 80 whenever an attempt is made to write into the field 80. Preferably, the field 80 is accessible only by the RNG 40 during the normal operation mode of the security element 20 so that the RNG 40 is the only entity that can write into the field 80 during the normal operation mode of the security element 20.

It is appreciated that if the RNG 40 and the field 80 enable a large enough number of random number combinations and the RNG 40 does not repeat any given value with more than negligible probability as is well known in the art of cryptography, the probability of generating, in any attempt to counterfeit the security element 20, a new random number that is already written in the security element 20 or in another genuine security element becomes negligible as is well known in the art of cryptography. For example, in secure communication systems that serve millions of users, it is sufficient to have the field 80 comprise a field of 128 bits and the RNG 40 comprise an RNG that outputs to the field 80 128-bit long non-repeating random numbers in order to render negligible the probability of repeating the random number in the security element 20 and/or the probability of generating a genuine random number that is already written in another genuine security element. In this respect, it is appreciated that a number of times an NVM can be written to is typically limited, for example in a case of an NVM that comprises an EEPROM to typically hundreds of thousands of times, and therefore a hacker cannot practically perform any number of trials he wants to generate a genuine random number.

A sufficiently low probability level may thus be predetermined, for example a probability level of $10^{-12}$, and it may preferably be required that the new random number be different from a random number previously written into the field 80 and from a random number already written in another genuine security element up to the predetermined probability level.

The new random number is therefore rendered different from a random number previously written into the field 80 and from random numbers written in other genuine security elements distributed to users, except with negligible probability as is well known in the art of cryptography.

Thus, even if a hacker knows a random number that is written in the NVM 50 of the security element 20, the hacker has no control over the RNG 40 and he cannot, for all practical purposes, force the RNG 40 to write the same number into clones that have the same type of protection mechanism. Also, any attempt by a corresponding RNG of a clone security element having the same type of protection mechanism to write the same number in a corresponding NVM of the clone security element will end up, except with negligible probability as is well known in the art of cryptography, with a different random number being automatically written by the corresponding RNG of the clone security element into a corresponding field of the corresponding NVM.

Preferably, the protection mechanism 70 enables use of an NVM test mode for testing the NVM 50 of the security element 20. The NVM test mode is preferably distinguished from a conventional functional test mode of the security element 20 in which typically all circuitry of the security element is tested while the protection mechanism 70 is enabled and active. The NVM test mode is typically employed before the security element 20 is distributed to a user.

In the NVM test mode, the memory controller 60 preferably uses an internal facility which marks the security element 20 as testable but unusable, disables usability of the security element 20 for providing secure access to a service, and enables testing of the NVM 50. Marking of the security element 20 may be performed, for example, by changing existing contents of a field 90. Alternatively, the memory controller 60 may disable usability of the security element 20 for providing secure access to a service and enable testing of the security element 20 without actually marking the security element 20.

At the end of the NVM test mode, an initial constant or random value may be present in the field 80, such initial value being for example a non-randomly selected number such as zero or a fixed number which is randomly-generated. It is appreciated that the initial value is typically written only for testing purposes and is not normally used in a genuine security element distributed to a user.

After NVM testing of the security element 20 is completed, the security element 20 is preferably switched to a normal operation mode during which marking is removed, for example, by restoring the original contents of the field 90. The RNG 40 then preferably automatically writes, for the first time, a random number into the field 80, and the random number overwrites the initial value. This random number renders the security element as one time programmable (OTP) since any attempt to override this number ends up with a different random number written into the field 80, which number is not used by any other genuine security element.

Preferably, before the security element 20 is provided to the user it is checked for example in the production process by conventional testing equipment. Checking of the security element 20 is made to ensure that a number written in the field 80 is not the initial value meaning typically that the random number has already been written in the field 80. This random number, together with genuine random numbers from other genuine security elements, may preferably be registered in a random number database (not shown) that may be kept, for example, at a central facility (not shown).

Registration of the random numbers in the random number database may be helpful in detecting counterfeited security elements in a case where security elements are able to communicate with the central facility via communication links. For example, each security element may be required to transmit its random number in a signed message to the central facility. At the central facility, the random number may be extracted from the message and checked to verify that it exists in the random number database. Random numbers that are not found in the database indicate that security elements that transmitted them are counterfeits.

In a case where there is no communication with a central facility, a conventional personalization procedure that generates a signature by using a conventional public key secure signature technique may be performed in each genuine security element. Preferably, a genuine random number of a genuine security element may be signed by a signature, and the genuine random number and its associated signature may be referred to as a reference message. If a non-genuine random number is later generated, a signature of the non-genuine random number will typically not match the signature in the reference message. The genuine security element may then preferably be enabled to provide secure access to services during a normal operation mode of the genuine security element only if a signature of a generated random number matches the signature in the reference message.

Additionally, since signatures are difficult to forge, clones of the genuine security element that use a copy of the reference message and non-genuine random numbers will not be able to generate signatures that match the signature in the copy of the reference message and thus such clones will not be enabled to provide secure access to the services.

Figure 2:
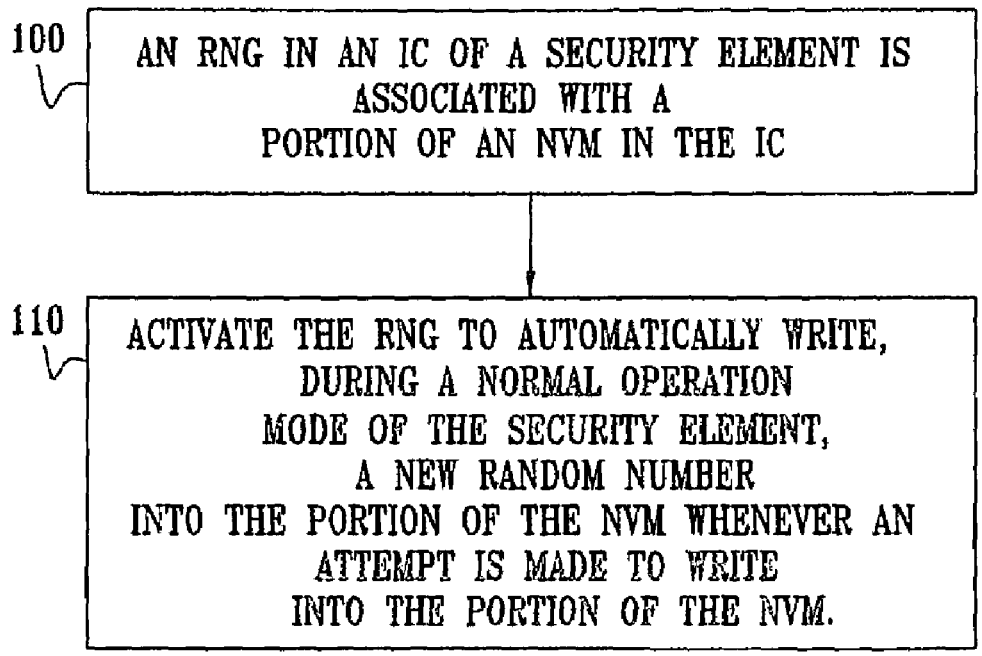
FIG. 2 is a simplified flowchart illustration of a preferred method of operation of the apparatus of FIG. 1.

Reference is now made to FIG. 2 which is a simplified flowchart illustration of a preferred method of operation of the IC 10 in the security element 20 of FIG. 1.

Preferably, an RNG in an IC of a security element is associated with a portion of an NVM in the IC (step 100). The RNG is then preferably activated to automatically write (step 110), during a normal operation mode of the security element, a new random number into the portion of the NVM whenever an attempt is made to write into the portion of the NVM.

Figure 3:
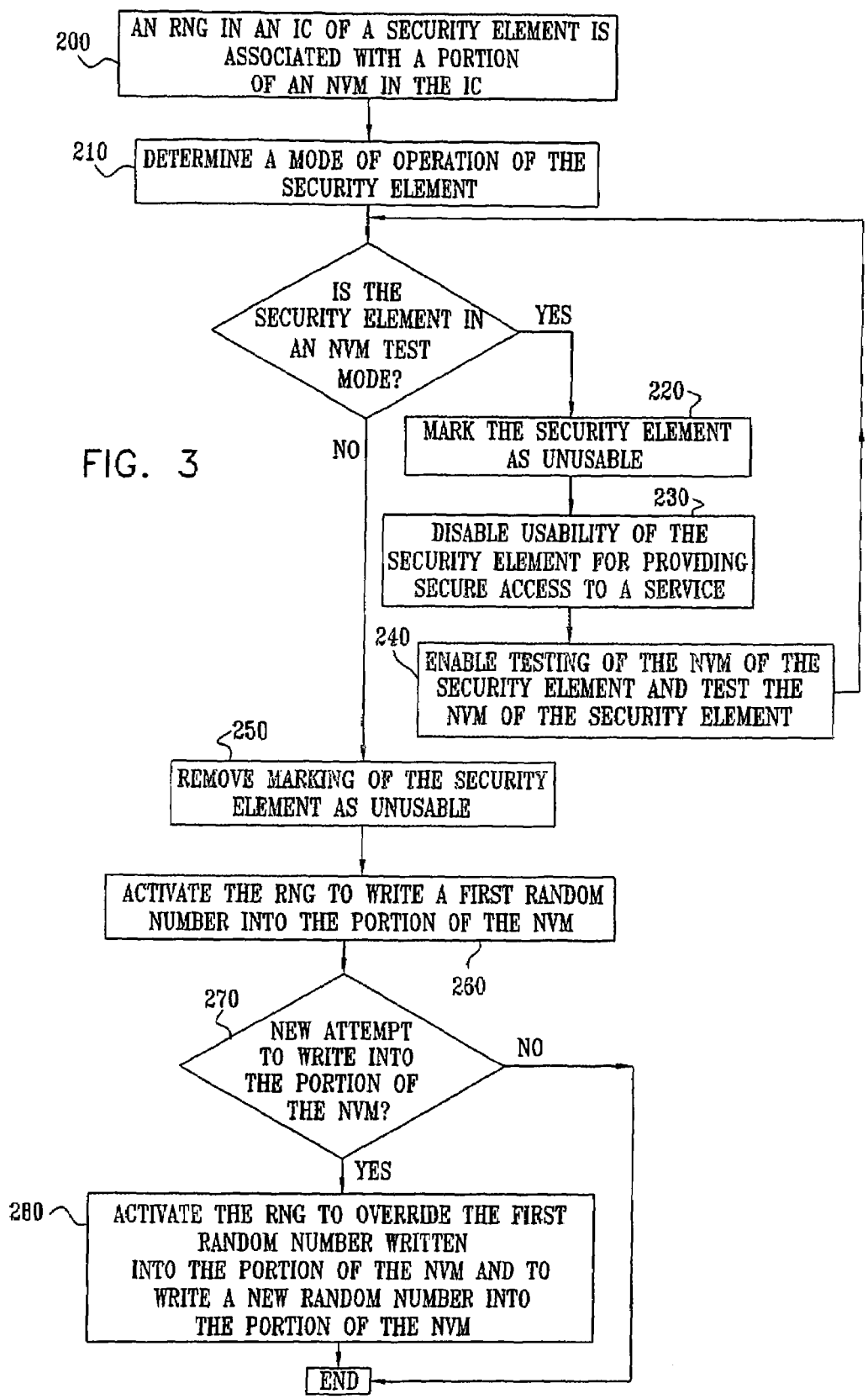
FIG. 3 is a simplified flowchart illustration of another preferred method of operation of the apparatus of FIG. 1.

Reference is now made to FIG. 3 which is a simplified flowchart illustration of another preferred method of operation of the IC 10 in the security element 20 of FIG. 1.

An RNG in an IC of a security element is preferably associated with a portion of an NVM in the IC (step 200). A mode of operation of the security element is then preferably determined (step 210), for example by a processor in the IC. Then, if the security element is in an NVM test mode, the security element is preferably marked as unusable (step 220), usability of the security element for providing secure access to a service is disabled (step 230), and testing of the NVM of the security element is enabled (step 240) and preferably performed.

On transition from the NVM test mode to a normal operation mode, marking of the security element as unusable is preferably removed (step 250), and, typically at the same time, the RNG is preferably activated to overwrite any initial value that may be present in the portion of the NVM by automatically writing once a first random number into the portion of the NVM (step 260) thereby rendering the security element operable. Typically, the first random number is not changed throughout the operability period of the security element unless, for example, a maintenance event that requires testing of the security element occurs.

If, for example, the security element is purchased by a hacker who tries to tamper with the security element by making a new attempt to write into the portion of the NVM (step 270), for example for the purpose of changing entitlements provided by the security element, the RNG is preferably activated to override the first random number written into the portion of the NVM and to write a new random number into the portion of the NVM (step 280) thereby rendering the security element inoperable. It is appreciated that the new random number is different from the first random number, except with negligible probability as is well known in the art of cryptography.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined only by the claims which follow:

What is claimed is:

1. A method for preventing cloning of a genuine security element, the method comprising:
associating a random number generator (RNG) in the security element with a portion of a non-volatile memory (NVM) in the security element; and
activating said RNG to automatically write, during a normal operation mode of the security element, a new random number into said portion of the NVM whenever an attempt is made to write into said portion of the NVM.

2. The method according to claim 1 and wherein said new random number is different from a random number previously written into said portion of the NVM up to a predetermined probability level.

3. The method according to claim 1 and wherein said associating comprises preventing any unit other than the RNG from writing data into said portion of the NVM during said normal operation mode of the security element.

4. A protection mechanism for preventing cloning of a genuine security element, the protection mechanism comprising:
a non-volatile memory (NVM); and
a random number generator (RNG) operatively associated with a portion of the NVM and activated to automatically write, during a normal operation mode of the security element, a new random number into said portion of the NVM whenever an attempt is made to write into said portion of the NVM.

5. The protection mechanism according to claim 4 and wherein said new random number is different from a random number previously written into said portion of the NVM up to a predetermined probability level.

6. The protection mechanism according to claim 4 and wherein said security element comprises at least one of the following: a smart card; and a security micro-controller.

7. The protection mechanism according to claim 4 and wherein said portion of the NVM comprises a field.

8. The protection mechanism according to claim 4 and wherein said portion of the NVM is accessible only by the RNG during said normal operation mode of the security element.

9. The protection mechanism according to claim 4 and also comprising a processor operative to determine a mode of operation of the security element, wherein:
if the security element is in an NVM test mode the processor is operative to perform the following:
disable usability of the security element for providing secure access to a service; and
enable testing of the NVM of the security element.

10. The protection mechanism according to claim 9 and wherein said processor is also operative to mark the security element as unusable when the security element is in the NVM test mode.

11. A security element comprising the protection mechanism of claim 4.

12. A method for preventing cloning of a genuine security element, the method comprising:
associating a random number generator (RNG) in the security element with a portion of a non-volatile memory (NVM) in the security element;
determining a mode of operation of the security element; and
if the security element is in an NVM test mode:
disabling usability of the security element for providing secure access to a service, and
enabling testing of the NVM of the security element; and
if the security element is in a normal operation mode:
activating said RNG to write a first random number into said portion of the NVM on transition from the NVM test mode to the normal operation mode; and
activating said RNG to override said first random number written into said portion of the NVM and to write a new random number into said portion of the NVM whenever a new attempt is made to write into said portion of the NVM.

13. The method according to claim 12 and wherein said new random number is different from the first random number up to a predetermined probability level.

14. The method according to claim 12 and also comprising marking the security element as unusable when the security element is in the NVM test mode.

15. The method according to claim 12 and also comprising transmitting the first random number in a signed message to a central facility.

16. The method according to claim 15 and also comprising:
   extracting the first random number from the signed message; and
   checking the first random number to verify its existence in a database of random numbers of genuine security elements.

17. The method according to claim 12 and also comprising disabling usability of the security element for providing secure access to the service during the normal operation mode of the security element if a signature of a random number generated by the RNG does not match a signature of the first random number.

18. A protection mechanism for preventing cloning of a genuine security element, the protection mechanism comprising:
   means for associating a random number generator (RNG) in the security element with a portion of a non-volatile memory (NVM) in the security element; and
   means for activating said RNG to automatically write, during a normal operation mode of the security element, a new random number into said portion of the NVM whenever an attempt is made to write into said portion of the NVM.

* * * * *